United States Patent [19]

Paris et al.

[11] 3,904,737

[45] Sept. 9, 1975

[54] METAL CYANIDE COMPLEXES

[76] Inventors: Rene Antoine Paris, 152 Cours Gambetta, Lyon 7°, Rhone; Paul Alexis Amblard, 3, rue Julien Baudran, Bron, Rhone; Abel Claude Rousset, 37 bis, rue Jean Moulin, Caluire, Rhone, all of France

[22] Filed: May 3, 1972

[21] Appl. No.: 250,079

[30] Foreign Application Priority Data

May 5, 1971 France .............................. 71.17247
Oct. 15, 1971 France .............................. 71.37942

[52] U.S. Cl. ...................... 423/252; 75/68 R; 75/84; 75/91; 423/263; 423/264; 423/367; 423/371
[51] Int. Cl.... C01f 15/00; C01f 17/00; C01b 21/00
[58] Field of Search .......... 423/252, 263, 364, 367, 423/271

[56] References Cited
UNITED STATES PATENTS

| | | | |
|---|---|---|---|
| 3,094,379 | 6/1963 | Cambi | 423/367 |
| 3,427,256 | 2/1969 | Milgrom | 423/367 X |
| 3,678,085 | 7/1972 | Rick et al. | 423/367 X |

*Primary Examiner*—Leland A. Sebastian
*Attorney, Agent, or Firm*—Karl F. Ross; Herbert Dubno

[57] ABSTRACT

Metal cyanide complexes of a single metal or mixed-metal complexes in which a metal is complexed with cyanide. The metals preferably include magnesium, beryllium, aluminum, chromium, titanium, zirconium, thorium, yttrium and cobalt and nickel in addition to the lanthanide metals. An aqueous solution is prepared and the complex is isolated by crystallization with a stoichiometry of the metals determined by their proportions in the solution.

8 Claims, No Drawings

METAL CYANIDE COMPLEXES

FIELD OF THE INVENTION

Our present invention relates to a method of making cyanide complexes of one or more metals and especially to the preparation of new metal complexes with selected ratios of various metals. The invention also relates to the new complexes made by this method and particularly those complexes which possess the ability of being reduced to form metal alloys with the constituent metals in the same or a similar ratio.

BACKGROUND OF THE INVENTION

The ability of the cyanide ion (CN—) to complex metal ions has been used to prepare a wide variety of so-called coordination complexes or coordination compounds hereinafter described as metallocyanide complexes. The most well known of these complexes are those of the ferrous ion Fe(II) and the ferric ion Fe(III). The cyanide complexes of these ions can best be described in terms of the formula for the hydrogen ferrocyanide $$H_4[Fe(CN)_6].$$

(I)

All or part of the hydrogen of this compound may be replaced by a metal ion or by a cation such as ammonium ($NH_4^+$), or may remain in the compound. The complex may thus have the general formula $$H_{(4-n)}M'_{m'/v'} M''_{m''/v''} \ldots [Fe(CN)_6]$$

(II)

in which $n$ is greater than or equal to 0 to 4 ($0 \leq n \leq 4$), $m'$, $m''$, ... are the coefficients of the cations $M'$, $M''$ ... representing the metals or ammonium ion, and $v'$, $v''$ ... are the valences of the respective cations. It will be apparent that $m' + m'' + \ldots = n$.

In an analogous manner, the ferricyanide comppexes derived from hydrogen ferricyanide $$H_3[Fe(CN)_6]$$

(III)

can be described as a compound of the following general formula $$H_{(3-n)}M'_{m'/v'}M''_{m''/v''} \ldots [Fe(CN)_6]$$ (IV)

in which $m'$, $m''$, $v'$, $v''$, $M'$, $M''$ etc have the same definitions as given above except that $0 \leq n \leq 3$.

These compounds are blue pigments widely used in many fields and identified as PRUSSIAN BLUE and TURNBULL BLUE. Various other cyanide compounds have been described in the literature for iron and other elements of the Periodic System. For example, apart from the single cyanide represented as $Ln(CN)_3$, where Ln represents the members of the lanthanide series of elements with atomic numbers of 57 to 71, inclusive, ferrocyanides of the lanthanide metals and alkali metals of the general formula $M'Ln[FeCN_6]$ are known, Ln being the general symbol for a lanthanide metal and M' representing an alkali metal such as sodium or potassium. The lanthanide ferrocyanides $Ln[Fe(CN)_6]$ are also known in the art as are the lanthanide nickelocyanide $Ln_2[Ni(CN)_4]$ and the lanthanide cobalticyanides $Ln[CoCN_6]$. For the most part these compounds are useful as pigments, are slightly soluble in water and may be obtained by precipitation from water by virtue of their low solubility products.

OBJECT OF THE INVENTION

It is the principal object of the present invention to provide new metal cyanide complexes with greater versatility than known compounds of the type set forth above.

It is also an object of our invention to provide an improved method of making such complexes.

DESCRIPTION OF THE INVENTION

We have discovered that a new class of compounds, which may be represented as metal complexes, may be made with considerable versatility in the selection of the metals and advantageous utility in the production of elemental metals, metal alloys or intermetallic compounds; such alloys are produced when the metal cyanide complex is reduced with hydrogen and the complexes may have, in addition, the known utilities of cyanide complexes as pigments, catalysts and dyestuffs. More particularly, the compounds of the present invention are new cyanide complexes of magnesium, beryllium, aluminum, chromium, titanium, zirconium, thorium, yttrium and the lanthanide elements with atomic numbers of 57 through 71 inclusive. In addition, the new complexes may include other metals, including those listed directly above, variable proportions of hydrogen, ammonium ion or the bivalent or trivalent ions of cobalt or nickel, especially Co(II), Co(III) and Ni(II).

The first group of compounds according to the present invention is of the monometallic type and include the tetracyanomagnesiate of magnesium: $Mg[Mg(CN)_4]$, the tetracyanoberyllate of beryllium: $Be[Be(CN)_4]$, the hexacyanoaluminate of aluminum: $Al[Al(CN)_6]$, the hexacyanochromiate of chromium: $Cr[Cr(CN)_6]$, the octacyanotitanate of titanium: $Ti[Ti(CN)_8]$, the octacyanozirconiate of zirconium $Zr[Zr(CN)_8]$, the octacyanothoriate of thorium $Th[Th(CN)_8]$, the hexacyanoyttriate of yttrium: $Y[Y(CN)_6]$, and all of the cyanolanthaniate complexes of the type: $Ln[Ln(CN)_6]$ where Ln represents any one of the lanthanide elements with atomic numbers between 57 and 71, inclusive.

The second group of the cyanide complexes which are included within the present invention are definable as polymetallic cyanide complexes having the general formula $$H_u M'_a M''_b \ldots [M(CN)_x]_p$$

(V)

where M is one of the metals set forth above, namely magnesium, beryllium, aluminum, chromium, titanium, zirconium, thorium, yttrium, the lanthanide metals of atomic numbers 57 through 71, inclusive, cobalt (II), cobalt (III) or nickel (II).

M', M'' etc. are each a metal differing from M and having a mono-, di-, tri- or tetravalent state. $x$ is a coefficient having the value 4, 6 or 8 according to the coordination number of the metal M and $u$, $a$, $b$ ... $p$ are coefficients selected to bring about a charge balance within the molecule and establishing the proportions of the different metallic ions. The hydrogen (H) in the general formula (V) may be replaced in whole or in part by $NH_4^+$.

The compounds of the second group are thus of the type described for the ferrocyanides $$H_{4-n}M'_{m'/v'} \, M''_{m''/v''} \ldots [Fe(CN)_6]; \quad (VI)$$

the ferricyanide $$H_{3-n}M'_{m'/v'} \, M''_{m''/v''} \ldots [Fe(CN)_6]; \quad (VII)$$

the lanthanum or other complexes $$M' \, Ln \, [Fe(CN)_6]; \quad (VIII)$$

$$Ln \, [Fe(CN)_6]; \quad (IX)$$

$$Ln_2 \, [Ni(CN)_4]_3; \text{ and} \quad (X)$$

$$Ln \, [Co(CN)_6]. \quad (XI)$$

Among the particular, totally new, complexes according to the present invention are the following: the cobaltocyanic lanthanates:

$$Ln_x \, H_{4y-3x} \, [Co(CN)_6]_y \quad (XII)$$

where $y \geq 1$ and $0 < x < 4/3 \, y$;
the cobaltocyanic lanthanates:

$$Ln_x \, H_{3y-3x} \, [Co(CN)_6]_y \quad (XIII)$$

where $y \geq 1$ and $0 < x < y$;
the chromicyanic lanthanate:

$$Ln_x \, H_{3y-3x} \, [Cr(CN)_6]_y \quad (XIV)$$

where $y \geq 1$ and $0 < x < y$;
the nickelocyanic lanthanate:

$$Ln_x \, H_{2y-3x} \, [Ni(CN)_4]_y \quad (XV)$$

where $y \geq 1$ and $0 < x \geq \frac{2}{3} \, y$.

Analogous complexes in which various lanthanide elements are used in variable proportions are represented by the general formula $$Ln_x' \, Ln_z'' \ldots H_{3y-3x-3z} \ldots [Ln(CN)_6]_y \quad (XVI)$$

in which Ln, Ln' and Ln'' . . . represent various lanthanide elements of the atomic numbers 57 through 71, inclusive, or yttrium. The hydrogen is able to be replaced totally or partially by the ammonium ion and the coefficients $x$, $y$, and $z$ should be selected such that $y \geq 1$, $x>0$, $x<y$, $z>0$, $z<y$ and $3y-3x-3z \geq 0$.

Among these compounds are the lanthanidocyanides of aluminum of the general formula:

$$Al_x \, H_{3y-3x} \, [Ln(CN)_6]_y \quad (XVII)$$

in which Ln represents an element of the lanthanide series or yttrium, hydrogen is able to be replaced in whole or in part by ammonium ion and the coefficients $x$ and $y$ and selected such that $y \geq 1$, $x \geq 0$ and $x<y$.

The cobalticyanide complexes of the lanthanide elements and bivalent elements as described above, e.g. bivalent alkaline-earth elements, have the general formula $$Ln_x \, M_z \, H_{3y-3x-2z} \, [Co^{III}(CN)_6]_y \quad (XVIII)$$

in which M is a bivalent metal and preferably an alkaline-earth metal such as magnesium or beryllium, Ln is one or more lanthanide elements and the coefficients $x$, $y$ and $z$ are so selected that $y>1$, $x>0$, $x<y$, $z>0$, $z>y$, and $3y-3x-3z \geq 0$. The corresponding nickel or divalentcobalt compounds may also be prepared as well as the chromicyanide or nickelocyanide complexes.

The cyanide complexes of the second group according to the present invention may be polymetallic and of the general formula $$H_{3-n}M_{m/v}M'_{p/v} \ldots [Al(CN)_6] \quad (XIX)$$

in which $n>0$, $n<3$, $m+p+\ldots=n$, M, M' . . . are metallic cations or the ammonium ion $NH_4^+$ and $v$, $v'$ . . . represent the valences of $M$, $M'$ etc.

All of the monometallic or polymetallic cyanide classes described above and falling within the definition of the present invention are, by contrast with the simple cyanide or the known cyanide complexes mentioned earlier, generally more soluble in water. Depending upon the individual complex of course the compound is relatively soluble or even highly soluble in this solvent.

As a result of this characteristic we have found it to be possible to produce the complexes with a variation in the ratio of the metals in the complex within large limits. This characteristic is to be contrasted with the well-defined or single-value composition of complexes formed by precipitation.

All of the compounds of the present invention, as defined above, may be used to produce powder metal alloys or powder elemental metals of high purity which may be used in many powder metallurgical applications. The powders may be pressed into any desired configuration, sintered at a temperature below the melting point of the metal or alloy and under pressure, and used directly or by bonding to a substrate. For example, powder-metal magnets may be made in this manner. The powder metals are formed from the monometallic or polymetallic cyanide complexes by reduction in hydrogen as described in our commonly owned copending application Ser. No. 250,080 filed concurrently herewith and entitled PRODUCTION OF METALS AND METAL ALLOYS OF HIGH PURITY.

The monometallic cyanide complexes may be prepared as follows:

Since all of the complexes of this category in accordance with the present invention are soluble in water, an aqueous solution of the complex is formed from which the complex is isolated by crystallization.

In order to obtain the aqueous solution according to the techniques already discussed in accordance with the invention, we prepare in an aqueous medium the acid corresponding to the cyanide complex of the desired metal M and having the general formula (XXI). This compound, which is a strong acid in solution, is reacted with a suspension of the hydroxide, oxide or carbonate of the metal M. As a consequence of the neutralization, the compound has a general formula representing the monometallic compounds described earlier.

The complex acid of the formula (XXI) may be obtained by either of two techniques. In one of these systems, the acid is formed by ion exchange on a cationic or anionic resin; thus, for example, it is possible to react an aqueous concentrated solution of potassium cyanide (KCN) with a gel of the hydroxide of the metal M to obtain the salt

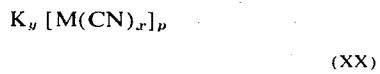

$$K_y\ [M(CN)_x]_p \qquad (XX)$$

of the complex acid. If one now passes this salt in aqueous solution through an acidic ion-exchange resin, the potassium ion $K^+$ is replaced by hydrogen $H^+$ and the complex acid $H_y\ [M(CN)_x]_p$ is produced.

It is also possible to produce the acid by reacting the concentrated aqueous solution of potassium cyanide with a saline solution (e.g. the chloride) of the metal M, precipitating the salt with alcohol, redissolving the precipitate in water after filtration and washing, and thereafter passing this solution of the salt of formula (XX) through an anion exchange resin to yield the complex acid of formula (XXI).

In the second technique, using ion-exchange principles, for producing the acid, the anionic ion-exchange resin is charged with cyanide ion by treating the resin with an aqueous concentrated solution of potassium cyanide. An aqueous solution of the chloride or nitrate of the metal M is then passed through the resin column and the complex acid of formula (XXI) is obtained as the eluate.

A method of producing the complex acid without the use of an ion-exchange resin comprises reacting an aqueous solution of the sulphate of metal M with barium cyanide, thereby producing a precipitate of barium sulphate and an aqueous solution of the barium salt of the complex acid. The precipitate is removed by filtration and the barium complex, e.g. $Ba_3[M(CN)_6]_2$, is treated with a stoichiometrically determined quantity of sulphuric acid to yield the complex acid of formula XXI when the freshly precipitated barium sulphate is removed.

A second technique for producing the aqueous solution of the metal cyanide complex, which avoids the preparation of the corresponding acid as an intermediate, involves the reaction of an aqueous solution of hydrocyanic acid (HCN) with a hydroxide gel, a hydrate, carbonate or acetate of the metal M; preferably this reaction is carried out in an autoclave of stainless steel with an aqueous solution of hydrocyanic acid of a concentration of 10 to 60 percent by weight and in an amount of 10 to 20 percent in excess over the theoretical quantity of the acid necessary for the formation of the complex. The hydrocyanic acid solution is preferably stabilized with a small quantity (of the order one part per thousand parts) of hydrochloric acid (HCl) in order to avoid polymerization of the HCN which is favored by certain metals (namely, beryllium, titanium and thorium).

The contents of the autoclave are vigorously stirred by an agitator and are heated at a temperature between 50°C to 150°C. Depending upon the temperature and the crystalline state of the metal compound, the treatment period may be longer or shorter. With higher temperature the reaction time is reduced and with metal compounds in a more finely divided or high reactive state, a shorter reaction time may be used.

When all of the metal compounds have been transformed into the soluble cyanide complex, the excess hydrocyanic acid is removed by volatilization and is recovered for subsequent use. The cyanide complex is then recovered as a solid. The recovery of the cyanide complex, produced by the techniques described above, is preferably carried out by concentrating the aqueous solution by evaporation under vacuum at a temperature between 40°C and 60°C, whereupon the crystals form. The crystals are then dried in vacuo.

Recovery of the solid from the aqueous solution can also be carried out somewhat more rapidly by forming an azeotrope of the water with a liquid nonmiscible therewith and having a low boiling point. A suitable azeotropic entrainer is ordinary gasoline. The azeotropic distillation, carried out at a reduced pressure, is desirable because it allows the metal-cyanide complex to be obtained without raising the temperature above 20°C to 40°C, and is particularly desirable for complexes of low stability.

Similar techniques may be used for the recovery of polymetallic cyanide complexes. Thus in one approach, according to the invention the acid complex

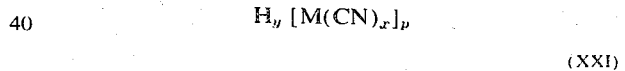

$$H_y\ [M(CN)_x]_p \qquad (XXI)$$

may be produced by one of the methods described above and the acid is reacted with a suspension of hydroxides obtained by mixture or coprecipitation of the metals instead of the other metals. Instead of the hydroxides, we may use a mixture of simple oxides or individual mixed oxides or a mixture of mixed oxides (double oxides) or solid solutions of oxides. Also the metal compounds with which the acid is reacted may be carbonates obtained by mixing the carbonates of two or more metals or by coprecipitating from a solution containing two or more metals, a mixed carbonate. The metal compounds thus contribute the different metals M', M'' . . . or ammonium ion to the resulting complex.

The proportions of the complex acid and the basic compounds (hydroxides, oxides and carbonates) with which the acid is reacted in a neutralization reaction, may be selected in accordance with the relative proportions of the metals desired in the polymetallic complex in accordance with the formula (V) given above.

In a second variant of the techniques for producing the polymetallic compounds, an aqueous solution of hydrocyanic acid is reacted with a mixture of hydroxide gel, hydrates, carbonates or acetates of the metals M, M', M'' in predetermined proportions under the conditions set forth for the production of monometallic complexes using hydrocyanic acid reactions.

In the formation of the high-purity metal powders or metal-alloy powders in accordance with the copending application mentioned above, for which all of the complexes of the present invention find utility, we prefer to dry the crystals of the metal cyanide complex in pure and dry hydrogen or under vacuum at about 200°C. The crystals are then placed in a pressure vessel or another hermetically sealed vessel through which hydrogen is passed at a rate of 2 liters per hour to 10 liters per hour at temperatures between 700°C and 1,300°C. Depending upon the melting point of the metal, it is recovered either as a liquid or as a powder. With metals such as zirconium, it is desirable to raise the temperature at the end of the reaction to at least 1,200°C to break down the zirconium hydride which is formed. In the case of thorium and other metals having highly stable hydrides, reduction treatment may be followed by heating under vacuum ($10^{-4}$ bar) at 1,100°C to break down the hydride.

The reduction with hydrogen reforms hydrogen cyanide which is collected and recycled for the reactions used in preparing the metal — metal complexes.

SPECIFIC EXAMPLES

EXAMPLE I

Production of the Tetracyanomagnesiate of Magnesium:

$Mg[Mg(CN)_4]$

A basic carbonate or hydroxide of a magnesium salt is prepared by precipitating the salt from aqueous solution by a solution of ammonium or sodium carbonate or ammonium carbonate. The precipitate is filtered, washed and placed in an autoclave with an aqueous solution of 10 to 40 percent by weight HCN, the latter being stabilized by hydrochloric acid as stated above. The proportions of the basic magnesium compound (precipitate) and the hydrocyanic acid are regulated to provide an excess of 10 to 20% HCN over the stoichiometric amount necessary for the reaction $$2 Mg(OH)_2 + 4 HCN \longrightarrow Mg[Mg(CN)_4] + 4 H_2O$$

(XXII)

The theoretical quantity is thus two moles HCN per mole of magnesium.

The mixture in the autoclave is stirred vigorously by an agitator and heated from 80°C to 150°C until a clear solution of the complex $Mg[Mg(CN)_4]$ is obtained. The hydrocyanic acid in excess is evolved by heating and the aqueous solution in the autoclave is concentrated under suction to precipitate the crystals. The solution is heated from about 40°C to about 60°C during this period.

EXAMPLE IA

The aqueous solution of the complex is formed in the manner described and an excess of gasoline, as an azeotropic entrainer is added. The mixture is heated at a temperature of 20°C to 40°C under reduced pressure to drive off the azeotrope.

The product of Example I-A is a white ctystalline solid which can be reduced with hydrogen to produce high purity magnesium powder (see the copending application mentioned above).

EXAMPLE II

Tetracyanoberyllia of beryllium:

$Be[Be(CN)_4]$

As described in Example I in the case of magnesium, the hydroxide or carbonate precipitate of beryllium is formed by treating beryllium nitrate in an aqueous solution with an ammonium solution or ammonium carbonate. The result is the basic precipitate. The basic precipitate is filtered, washed and reacted in an autoclave with a stabilized aqueous solution of hydrocyanic acid under the same condition as in Example I. The aqueous solution of the beryllium cyanide complex $Be[Be(CN)_4]$ is recovered in the form of white crystals by simple evaporation and by azeotropic distillation into separate portions as described in Examples I and IA. A fine powdered beryllium is obtained for powder-metallurgy and for use in a bearing body by reaction of hydrogen with the complex as described in the above mentioned copending application.

EXAMPLE III

Hexacyanoaluminate of aluminum:

$Al[Al(CN)_6]$

A freshly prepared quantity of aluminum hydrate is treated with an aqueous solution of hydrocyanic acid with a concentration of 10 to 40 percent by weight. The reaction $$2 Al(OH)_3 + 6 HCN \rightarrow [Al(CN)_6] + 6 H_2O$$

(XXIII)

is carried out at atmospheric pressure by agitating vigorously a suspension of the aluminum hydrate gel in the hydrocyanic acid at a temperature of 50°C. The vessel used to carry out the reaction is provided with a reflex condenser at its upper end to return vaporized reaction components. The reaction is rapid and its end can be determined from the reduction of the hydrocyanic acid concentration. Again the hydrocyanic acid is used at 10 to 20 percent excess.

In order to avoid the loss of hydrocyanic acid and to operate at a temperature above 50°C which increases the rate of reaction, the aluminum hydrate may be replaced by a less reactive hydrate such as hydrargyllite produced by the Bayer process. The reaction can then be carried out under pressure in the autoclave.

The aqueous solution of the complex is evaporated at 50°C to 60°C and the compound $Al[Al(CN)_6]$ is recovered as a white crystalline solid which is dried under vacuum. Azeotropic distillation, using gasoline, can be carried out under reduced pressure as described in Example IA.

EXAMPLE IV

Hexacyanochromia of chromium (III):

$Cr[Cr(CN)_6]$

Chromium hydroxide gel is prepared by treating an aqueous solution of a chromium salt with an alkali metal hydroxide or carbonate or by hydrolysis of alkali-metal chromite. The chromium hydroxide gel is filtered or centrifuged and washed until free from impurity. The moist hydroxide is reacted in an autoclave with a solution of hydrocyanic acid stabilized as described in connection with Example I and in an excess of 10 to 20 percent over the quantity theoretically required to form the complex in accordance with the reaction $$2 Cr(OH)_3 + 6 HCN \rightarrow Cr[Cr(CN)_6] + 6 H_2O$$

(XXIV)

In this case the theoretical ratio is three moles of hydrocyanic acid to one mole of chromium. The solid is recovered as described in Examples I and II in the form of red crystal. As in the previous examples, the product can be used to produce high-purity chromium powder by reduction with hydrogen as described in the copending application.

EXAMPLE V

Octacyanotitanate of titanium (IV):

$$Ti[Ti(CN)_8]$$

A titanium hydroxide gel is prepared by hydrolysis of titanium sulphate as produced by reacting ilmenite with sulphuric acid or by hydrolysis of titanium tetrachloride produced by chlorination of rutile. The gel is filtered or centrifuged, washed until thoroughly free from impurities and treated, while moist, in an autoclave with a stabilized HCN solution under the conditions mentioned in Example I. However, in establishing the excess of HCN over that stoichiometrically required to convert the basic gel into the complex, a 4:1 molar ratio of HCN to Ti must be considered because of the reaction scheme:

$$2Ti(OH)_4 + 8 HCN \rightarrow Ti[Ti(CN)_8] + 8 H_2O$$

(XXV)

White crystals of the titanium complex are recovered as described in the preceding Examples and the complex may be used for the production of metal powder as described in the copending application mentioned earlier.

EXAMPLE VI

Octacyanozirconate of zirconium (IV):

$$Zr[Zr(CN)_8]$$

Zirconium hydroxide is prepared by treating an aqueous solution of zirconyl chloride with an aqueous solution of ammonia to precipitate the basic zirconium compound which is filtered, washed and treated, without drying, in an autoclave with a stabilized solution of hydrocyanic acid in 10 to 20 percent excess as in Example V. The white crystalline complex is recovered by the methods described in the previous examples and may be reduced with hydrogen to yield metal particles.

EXAMPLE VII

Octacyanothorate of thorium:

$$Th[Th(CN)_8]$$

Thorium hydroxide gel is prepared by reacting an aqueous solution of thorium nitrate with aqueous ammonia (NH$_4$OH), is filtered and is washed. The hydroxide is treated, without intervening drying in an autoclave with a solution of hydrocyanic acid as described in connection with Example V. The white crystals of the complex are recovered and used for the production of metal powders as already described.

EXAMPLE VIII

Hexacyanogadolinate of gadolinium:

$$Gd[Gd(CN)_6]$$

A gadolinium hydroxide gel is prepared by precipitating it from an aqueous solution of the gadolinium nitrate, sulphate or chloride salt with ammonium or soda. The gel is recovered by filtration or centrifugation and is repeatedly rinsed until free from traces of impurities. Without being dried, the hydroxide gel is reacted in an autoclave with a stabilized solution of hydrocyanic acid under the conditions described in Example IV. The white crystals of the gadolinium complex are then recovered as described in the preceding examples for use in the production of the free metal.

EXAMPLE VIII A

Hexacyanogadolinate of gadolinium:

$$Gd]Gd(CN)_6]$$

An aqueous solution of the complex acid: $H_3[Gd(CN)_6]$ is prepared by reacting a solution of gadolinium sulfate with barium cyanide to yield a solution containing the barium salt of the acid, i.e. $Ba_3[Gd(CN)_6]_2$ according to the reaction:

$$Gd_2(SO_4)_3 + 6Ba(CN)_2 \rightarrow 3BaSO_4\downarrow + Ba_3[Gd(CN)_6]_2$$

(XXVI)

The barium sulphate is removed by filtration and the barium complex solution is treated with sulphuric acid in the quantity stoichiometrically indicated to yield the complex acid, the barium being eliminated as the insoluble sulphate. The complex acid is reacted with commercial $Gd_2O_3$, to yield the complex $Gd[Gd(CN)_6]$, in stoichiometrically calculated amounts. The white crystals are then recovered as in Example VIII.

EXAMPLE VIIIB

Lanthanide Metal Complexes

In each of Examples VIII and VIIIA, the process is repeated using in turn, yttrium, lanthanum, Ce, Pr, Nd, Sm, Eu, Tb, Dy, Ho, Er, Tm, Yb, and Lu in place of gadolinium. In each case, crystals are recovered which can be directly reduced with hydrogen (see the copending application), to yield the powdered elemental metal in a state of high purity.

EXAMPLE IX

Preparation of Bimetallic Cyanides of Aluminum:

$$H_{3-n}M_{n/v}[Al(CN)_6]$$

(XXVII)

where $0 \leq n \leq 3$

Bimetallic cyanide complexes of the formula (XXVII), containing variable proportions of aluminum, a metal M and hydrogen in variable proportions can be produced in accordance with the techniques described earlier. In the formula, $v$ represents the valence of the metal M in this complex.

Where the metal M is lanthanum, $v=3$ and $n=1.0$:

$$H_2 La_{1/3} [Al(CN)_6]$$

(XXVIII)

an aqueous solution of the acid complex:

$$H_3[Al(CN)_6] \tag{XXIX}$$

is produced by precipitating a hydroxide gel of aluminum by adding an ammoniacal solution to an aqueous solution of a soluble aluminum salt. The gel is filtered and washed. The washed precipitate is then treated with a concentrated solution of potassium cyanide in which it dissolves slowly at room temperature. At the end of several days the nondissolved gel is removed by filtration and the filtrate constituted an aqueous solution of the hexacyanoaluminate of potassium:

$$K_3[Al(CN)_6] \tag{XXX}$$

The complex is present together with excess potassium cyanide which has not been consumed by reaction with the hydroxide.

Ion-exchange techniques are now used to transform this alkali metal salt of the complex into the corresponding acid.

A strong-acid ion exchange (MERCK 1 or some other sulfonated polystyrene, 8–8.3 percent cross linked, dry exchange capacity equals 5.0 meq/gram, wet exchange capacity 2.0 meq/gram, 7 to 10 percent swelling on exchange) is charged with acid and the potassium salt solution passed therethrough. The resulting complex has a pH of about one, which is less than that of the HCN formed in the ion exchange. The complex acid has the formula $$H_3[Al(CN)_6] \tag{XXXI}$$

The acid solution which is of low stability is reacted immediately with a suspension of lanthanum hydroxide or oxide in proportions calculated to bring about complete consumption of the complex acid, the accompanying HCN being practically nonreactive under these conditions. The resulting solution, concentrated by evaporation at 40°C to 50°C under vacuum, or by azeotropic distillation under vacuum in accordance with Example IA. The white cyanide complex, obtained in crystalline form, has the formula (XXVIII).

EXAMPLE X

Production of a Bimetallic Cyanide Complex With Variable Proportions of Cobalt and Samarium The present example may be used without changing any of the parameters to produce cyanide complexes of cobalt and all of the other lanthanide elements of yttrium.

The system requires preparation of an aqueous solution of the complex acid:

$$H_4[Co^{II}(CN)_6] \tag{XXXII}$$

or other complex acid:

$$H_3[Co^{III}(CN)_6] \tag{XXXIII}$$

The samarium oxide $Sm_2O_3$ is reacted with one or the other of the acid complexes to produce the white metallic complex $$Sm_x H_{4y-3x}[Co^{II}(CN)_6]_y \tag{XXXIV}$$

or $$Sm_x H_{3y-3x}[Co^{III}(CN)_6]_y \tag{XXXV}$$

with $x$ and $y$ having the values given for formulas (XKK) and (XIII). Thereafter the white metallic complex is recovered in the solid state.

Each of the successive steps described above is able to be carried out in several ways and all have been used to obtain part of the final products.

EXAMPLE XA

Preparation of the Acid Complex of Formula (XXXII)

An aqueous solution of the hexacyanocobaltate of potassium $$K_4[Co^{II}(CN)_6] \tag{XXXVI}$$

is produced by treating cobalt chloride or sulphate with a slight excess of potassium cyanide. The reddish violet solution is subjected to precipitation by addition of alcohol to yield the salt of the (XXXVI) which is removed by filtration and washed in alcohol. The crystals are dissolved in water and passed through the MERCK 1 ion exchange resin mentioned earlier previously charged with acid to produce the acid complex. The latter is employed as described below.

EXAMPLE XB

Cobalt sulphate is reacted in aqueous solution with barium cyanide according to the reaction scheme $$CoSO_4 + 3 Ba(CN)_2 \rightarrow BaSO_4 + Ba_2[Co^{II}(CN)_6] \tag{XXXVII}$$

the barium sulphate being removed by filtration. The cyanide complex is treated with sulphuric acid in the stoichiometric quantity required to yield the acid of formula (XXXII) upon removal of the barium sulphate by filtration. This acid complex is used as described below.

EXAMPLE XC

The acid complex of formula (XXXIII) is produced by passing a stream of air through the aqueous solution of the acid complex of formula (XXXII) prepared in accordance with Example XA or XB. A reaction with oxygen takes place and can be followed by observing the development of the yellow color characteristics of the acid complex of formula (XXXIII). It should be obvious that, if desired, it is possible to obtain a mixture of the complexes of cobalt II and cobalt III.

EXAMPLE XD

In order to produce bimetallic complexes with a cobalt/samarium molar ratio of 5 the following procedure is used. The procedure being effective for all other ratios with the exception of a cobalt/samarium molar ratio ≤ 1.

The samarium oxide $Sm_2O_3$ is reacted with a solution of the acid complex of Examples XA and XB or Example XC in an inner atmosphere (nitrogen or argon), although the use of the acid formula (XXXII) requires no special antioxidation procedure. The ratio of the reaction is selected to obtain the desired molar ratio, i.e. a cobalt/samarium ratio = 5. The resulting complex has the formula $$H_{17}SM[Co^{II}(CN)_6]_5 \qquad (XXXVIII)$$

or $$H_{12}Sm[Co^{III}(CN)_6]_5 \qquad (XXXIX).$$

Since the solubility of the samarium oxide in the acid-complex solution is relatively slow at room temperature, we heat the system at 50°C to 70°C for promoting reaction.

EXAMPLE XE

The aqueous solutions of Example XD are individually concentrated under vacuum by evaporation at temperatures of 40°C to 60°C until the crystals form. The latter are clear yellow in both cases.

EXAMPLE XF

The solutions obtained in Example XD are mixed with gasoline and subjected to azeotropic distillation under reduced pressure at a temperature between 20°C to 40°C. Again each solution yields a clear yellow crystal.

EXAMPLE XI

The Preparation of Bimetallic Complexes of Nickel and Neodymium

The present example represents the techniques used for producing bimetallic complexes of nickel and neodymium although it has been employed effectively for producing all of the cyanide complexes of the same type in which the neodymium is replaced by the other lanthanide elements or yttrium. An acid complex of the formula $$H_2[Ni(CN)_4] \qquad (XL)$$

is prepared by treating a solution of nickel chloride or sulphate with a slight excess of potassium cyanide, this solution having a yellowish orange color, is precipitated without alcohol to yield the potassium salt $$Nd_xH_{2y-3x}[Ni(CN)_4]_y \qquad (XLI)$$

The crystals are filtered, washed with alcohol and dissolved in water for ion exchange reaction to produce the acid as described in Example X. The bimetallic complex, which has the formula $$K_2[Ni(CN)_4] \qquad (XLII),$$

where $x$ and $y$ have the meanings set forth for the compound (XV), is produced with a nickel/neodymium ratio of 5 to yield the compound $$NdH_7[Ni(CN)_4]_5 \qquad (XLIII).$$

At 50°C to 70°C commercial neodymium oxide ($Nd_2O_3$) is reacted with the complex acid of formula (XLII) in the molar proportion indicated. The crystals are recovered as described in Examples XE and XF and are a translucent green.

EXAMPLE XII

A bimetallic complex containing variable proportions of chromium and yttrium is prepared as described below, the technique being useful for the formation of chromium complexes together with metals of the lanthanide group which may be substituted for the yttrium. The potassium salt of the chromium-cyanide anion $$K_3[Cr(CN)_6] \qquad (XLIV)$$

is produced in accordance with the technique described in volume 28 of the *Jounal of the American Chemical Society*, Page 1132ff — 1906. 60 grams of chromium anhydride ($CrO_3$) are dissolved in 150cc of concentrated HCl in 75cc of water. 75cc of 95% ethyl alcohol is added and the solution is evaporated to dryness. The residue is dissolved in 225cc of boiling water. 150 grams of potassium cyanide in 300cc of warm water are added little by little with strong agitation. The solution is permitted to stand in air and yellow crystals of the salt of formula (XLIV) deposit. These crystals, dissolved in water, are passed through a cationic ion-exchange resin of the MERCK 1 type as described. The eluate is a solution having the formula $$H_3[Cr(CN)_6] \qquad (XLV).$$

The solution is reacted with commercial grade yttrium oxide ($Y_2O_3$) at a temperature of 50°C over a period of about 15 minutes to produce a solution, the quantity of reactance being selected to provide a chromium/yttrium ratio of about 1. Other ratios may be used. The complex salt solution is evaporated in air at 50°C to allow the crystals of formula $$Y[Cr(CN)_6] \qquad (XLVI)$$

to form.

EXAMPLE XIII

A polymetallic cyanide complex is produced with yttrium and lanthanum in the manner set forth below, the technique being applicable for producing cyanide complexes in which the element lanthanum or the element yttrium can be replaced by any of the lanthanide elements in accordance with the general formula $$Ln'_x Ln''_z \ldots H_{3y-3x-3z} \ldots [Ln(CN)_6]_y \quad \text{(XLVII)}.$$

The complex which is produced here, however, has the formula $$La[Y(CN)_6] \quad \text{(XLVIII)}.$$

The acid complex $$H_3[Y(CN)_6] \quad \text{(IL)}$$

is produced by mixing a solution of yttrium sulphate with barium cyanide in accordance with the reaction scheme $$Y_2(SO_4)_3 + 6 Ba(CN)_2 \rightarrow 3 BaSO_4 + Ba_3[Y(CN)_6]_2 \quad \text{(L)}.$$

The barium sulphate is removed by filtration and the solution of the cyanide complex is treated by the stoichiometric quantity of sulphuric acid necessary to yield the complex acid of formula (IL) in solution. The barium is removed in the form of its insoluble sulphate. The acid is reacted with commercial grade lanthanum oxide $La_2O_3$ in the stoichiometric proportion necessary to yield, in solution, the complex of formula (XLVIII) as described in the previous example. This solution is treated to precipitate the complex in the form of white crystals as already described.

EXAMPLE XIV

Bimetallic complex of lanthanum and aluminum is prepared as described below. The same parameters may be used for aluminum-containing complexes in which any of the lanthanide elements or yttrium are substituted for lanthanum in accordance with the general formula $$Al_x H_{3y-3x} [Ln(CN)_6]_y \quad \text{(LI)}.$$

The particular complex of this case is represented by the formula $$Al[La(CN)_6] \quad \text{(LII)}.$$

We first prepare the acid $$H_3[La(CN)_6] \quad \text{(LIII)}$$

as described for the yttrium-containing acid of Example XIII. This acid is then reacted with aluminum hydroxide gel also prepared as described above in the stoichiometric proportion necessary to yield a lanthanum/aluminum molar ratio of 1. The solution of the complex of formula (LII) is then evaporated as described to deposit white crystals of the hexacyanolanthanate of aluminum.

EXAMPLE XV

A trimetallic complex of the general formula $$Ln_x M_z H_{3y-3x-2z} [Co^{III}(CN)_6]Y \quad \text{(LIV)}$$

is prepared in the manner described in Example X and is reacted with a suspension of barium hydroxide and samarium oxide in proportions adapted to yield, in the aqueous solution, the complex $$Sm\ Ba_{0.1}\ H_{11.8}\ [Co(CN)_6]_5 \quad \text{(LVI)}.$$

The complexes are recovered in the same manner as in EXAMPLE X to yield yellow crystals.

EXAMPLE XVI

A polymetallic cyanide complex of the general formula $$Ln'_x Ln''_x \ldots H_{3y-3x-3x} \ldots [Co(CN)_6]_7 \quad \text{(LVII)}$$

is prepared wherein $Ln'$=samarium, $Ln''$=neodymium, $Ln'''$=praseodymium, $x'$=0.5, $x''$=0.25, $x'''$=0.25 and $y$=5. The complexes thus have the formula $$Sm_{0.5}\ Nd_{0.25}\ Pr_{0.25}\ H_{12}\ [Co(CN)_6]_5 \quad \text{(LVIII)}.$$

The cobalt acid complex $$H_3\ [Co(CN)_6] \quad \text{(LIX)}$$

is prepared as described in EXAMPLE X and is reacted with a mixture of $Sm_2O_3$, $Pr_6O_{11}$ and $Nd_2O_3$ in proportions necessary to yield the complex of formula (LVIII). The yellowish green crystals are obtained from the solution in the manner described in EXAMPLE X.

In all cases, the corresponding metal or metal alloy is prepared by drying the crystals in a stream of hydrogen at a temperature of 200°C and then raising the temperature at a rate of 600°C per hour until the temperature is in the range of about 700°C to 1,300°C while maintaining the flow of pure dry hydrogen for about 3 hours. Where the metal has a melting point below the reduction temperature the metal is recovered as a fused body and wherever the metal has a melting point above the reduction temperature it is obtained as the powder.

We claim:

1. A metal-metal cyanide complex selected from the group which consists of: Mg [Mg (CN)$_4$], Be [Be (CN)$_4$], Al [Al (CN)$_6$], Ti [Ti (CN)$_8$], Zr [Zr (CN)$_8$], Th [Th (CN)$_8$], Y [Y (CN)$_6$], and Ln [Ln (CN)$_6$], wherein Ln represents a lanthanide element with an atomic number between 57 and 71 inclusive.

2. A metal-metal cyanide complex selected from the group which consists of:
cobaltocyanic lanthanide of the formula $$Ln_x\ H_{4y-3x}\ [Co(CN)_6]_Y$$

where $y \geq 1$ and $0 < x < 4/3\ Y$;
cobalticyanic lanthanide $$Ln_x H_{3y-3x} [Co(CN)_6]_y$$

where $y \geq 1$ and $0 < x < y$;
chromicyanic lanthanide $$Ln_x H_{3y-3x} [Cr(CN)_6]_y$$

where $y \geq 1$ and $0 < x < y$;
nickelocyanic lanthanide $$Ln_x H_{2y-3x} [Ni(CN)_4]_y$$

where $y \geq 1$ and $0 < x \leq \frac{2}{3} Y$;
cobaltocyanic polylanthanide $$Ln'_x Ln''_z \ldots H_{4y-3x-3z} \ldots [Co(CN)_6]_7$$

where $y \geq 1$, $0 < x < 4/3\, y$
where $0 < z < 4/3\, y$,
and $4y - 3x - 3z \geq 0$;
cobalticyanic polylanthanide $$Ln'_x Ln''_z \ldots H_{3y-3x-3z} [Co(CN)_6]_y$$

where $y \geq 1$, $0 < x < y$ and $0 < z < y$ $3y-3x-3z \leq 0$;
chromicyanic polylanthanide $$Ln'_x Ln''_z \ldots H_{3y-3x-3z} \ldots [Cr(CN)_6]_y$$

where $y \geq 1$, $0 < x < y$, $0 < z < y$, and $3y-3x-3z \geq 0$;
nickelocyanic polylanthanide $$Ln'_x Ln''_z \ldots H_{2y-3x-3z} \ldots [Ni(CN)_4]_y$$

where $y > 1$, $0 < x < \frac{2}{3}Y$,
$0 < z < \frac{2}{3}\, y$, and
$2y - 3x - 3z \geq 0$;
polylanthanide cyanide complexes of the general formula:

$$Dn_x' Ln_z'' \ldots H_{3y-3x-3z} \ldots [Ln(CN)_6]_y$$

in which Ln, Ln', Ln'' . . . represent elements of the lanthanide series having an atomic number between 57 and 71 inclusive or yttrium and the coefficients $x$, $y$ and $z$ have the relationships $$y \geq 1, 0 \leq x \leq y, 0 \leq z \leq y \text{ and } 3y-3x-3z \geq 0;$$

the lanthanide cyanides of aluminum of the general formula $$Al_x H_{3y-3x} [Ln (CN)_6]_y$$

in which Ln represents a lanthanide element having an atomic number between 57 and 71 inclusive or yttrium and the coefficients $x$ and $y$ are selected such that $$y \geq 1 \text{ and } 0 \leq x \leq y;$$

the cobalticyanides of lanthanides and of bivalent metals of the general formula $$Ln_x M_z H_{3y-3x-2z} [Co^{III}(CN)_6]_y$$

in which M represents a bivalent metal, where Ln represents a lanthanide series element having an atomic number between 57 and 71 inclusive and $x, y$ and $z$ are selected such that $$Y > 1, 0 < x < y, 0 < z < y \text{ and } 3y-3x-3z \geq 0;$$

the cobalticyanides of a plurality of lanthanide elements and a bivalent metal wherein M may be selected from the alkaline earth metals and having the general formula $$Ln'_{x'} Ln''_{x''} \ldots M_z H_{3y-2z-3x'-3x''} \ldots [Co^{III}(CN)_6]_y$$

where Ln', Ln'' . . . are lanthanide elements with atomic number between 57 and 71 and $y > km$ $0 < x' < y$, $0 < x'' < y$, $0 < z < y$ and $3y-2z-3x'-3x'' \ldots \geq 0$;
the polymetallic complexes of the general formula $$H_{3-n} M_{m/v} M'_{p'/v'} \ldots [Al(CN)_6]$$

where $0 < n < 3$ and $m+p+\ldots = n$, $M, M' \ldots$ being metallic cations with valences $v, v' \ldots$ or the ammonium ion $m, p' \ldots$ being coefficients balancing the electrical charge of the molecule.

3. A process for preparing a metal cyanide comprising the steps of forming a metal cyanide complex in aqueous solution and crystallizing the complex salt from said solution, said cyanide complex being formed in solution by reacting a complex acid of the general formula $H_y$, where M is a metal forming part of the complex, X is the coordination number of the metal and y and p are selected to insure charge balance in the molecule, with a hydroxide, oxide or carbonate of a metal which may be the same as the metal of said acid or different, said metals being selected from the group which consists of magnesium, beryllium, aluminum, chromium, titanium, zirconium, thorium, yttrium, cobalt, nickel and the elements of the lanthanide series having an atomic number between 57 and 71 inclusive.

4. The process defined in claim 3 wherein the complex which is crystallized from said aqueous solution is a monometallic complex and the metal of said acid is identical to the metal of said hydroxide, oxide or carbonate.

5. A process for preparing a metal cyanide comprising the steps of forming a metal cyanide complex in aqueous solution and crystallizing the complex salt from said solution, said complex being formed in solution by reacting hydrocyanic acid in an aqueous solution with the hydroxides, oxides, carbonates or acetates of at least two different metals selected from the group which consists of magnesium, beryllium, aluminum, chromium, titanium, zirconium, thorium, yttrium, cobalt, nickel and the elements of the lanthanide series having an atomic number between 57 and 71 inclusive.

6. The process defined in claim 5 wherein the hydrocyanic acid is used at a concentration of 10 to 60 percent by weight and is provided in an excess of 10 to 20 percent over that which can react with the compounds of said metals.

7. The process defined in claim 3 wherein said crystals are formed from said aqueous solution by evaporating said aqueous solution under vacuum at a temperature of 40° to 60°C.

8. The process defined in claim 3 wherein said crystals are formed from said aqueous solution by azeotropically removing water therefrom.

* * * * *